(12) United States Patent
Wu et al.

(10) Patent No.: US 9,124,311 B2
(45) Date of Patent: *Sep. 1, 2015

(54) MULTI-BAND MULTI-PATH RECEIVING AND TRANSMITTING DEVICE AND METHOD, AND BASE STATION SYSTEM

(71) Applicant: Huawei Technologies Co., Ltd., Shenzhen (CN)

(72) Inventors: Wangjun Wu, Shanghai (CN); Yulin Li, Shanghai (CN); Fengqing Yan, Shanghai (CN); Xiaodong Zhang, Shanghai (CN); Xiwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,835

(22) Filed: Aug. 22, 2014

(65) Prior Publication Data
US 2014/0364072 A1    Dec. 11, 2014

Related U.S. Application Data

(63) Continuation of application No. 13/074,798, filed on Mar. 29, 2011, which is a continuation of application No. PCT/CN2011/070345, filed on Jan. 18, 2011.

(30) Foreign Application Priority Data

Dec. 15, 2010    (CN) .......................... 2010 1 0590971

(51) Int. Cl.
*H04B 1/38*     (2006.01)
*H04B 1/00*     (2006.01)
*H04B 1/50*     (2006.01)

(52) U.S. Cl.
CPC .............. *H04B 1/005* (2013.01); *H04B 1/0057* (2013.01); *H04B 1/50* (2013.01)

(58) Field of Classification Search
CPC ................................. H04B 1/0057; H04B 1/16
USPC ........ 455/84, 562.1, 73, 553.1, 76, 86, 552.1, 455/313, 314, 315; 375/295, 377
See application file for complete search history.

(56) References Cited

U.S. PATENT DOCUMENTS

| | | | |
|---|---|---|---|
| 7,162,218 B2 | 1/2007 | Axness et al. | |
| 7,518,469 B2 * | 4/2009 | Kemmochi et al. | 333/126 |
| 7,573,398 B2 | 8/2009 | Hoctor et al. | |
| 7,609,793 B2 | 10/2009 | Tomioka et al. | |

(Continued)

FOREIGN PATENT DOCUMENTS

| | | |
|---|---|---|
| CN | 101453759 A | 6/2004 |
| CN | 1522089 A | 8/2004 |

(Continued)

*Primary Examiner* — Pablo Tran
(74) *Attorney, Agent, or Firm* — Slater & Matsil, L.L.P.

(57) ABSTRACT

A multi-band multi-path receiving and transmitting device and method are provided. The multi-band multi-path receiving and transmitting device includes at least two multi-frequency couplers, a multi-band transceiver, and a signal processing module. The multi-band transceiver includes at least two first frequency band receiving branches and at least two second frequency band receiving branches, and the multi-band transceiver is adopted to decrease the number of the transceivers, thereby reducing the material cost and the mounting cost of the base station system.

6 Claims, 11 Drawing Sheets

(56) References Cited

U.S. PATENT DOCUMENTS

| | | | |
|---|---|---|---|
| 7,729,724 | B2 | 6/2010 | Rofougaran et al. |
| 7,778,613 | B2 | 8/2010 | Seendripu et al. |
| 7,991,013 | B2 | 8/2011 | Gupta et al. |
| 8,315,577 | B2 * | 11/2012 | Kemmochi et al. ............ 455/78 |
| 8,644,197 | B2 | 2/2014 | Lee et al. |
| 8,768,410 | B2 * | 7/2014 | Oka et al. .................. 455/553.1 |
| 8,774,067 | B2 * | 7/2014 | Rousu et al. ................. 370/297 |
| 2002/0137472 | A1 | 9/2002 | Quinn et al. |
| 2002/0183016 | A1 | 12/2002 | Kemmochi et al. |
| 2005/0119025 | A1 | 6/2005 | Mohindra et al. |
| 2005/0143023 | A1 * | 6/2005 | Shih ............................. 455/101 |
| 2005/0245201 | A1 * | 11/2005 | Ella et al. ....................... 455/78 |
| 2006/0044080 | A1 * | 3/2006 | Hagiwara et al. ............ 333/195 |
| 2006/0194550 | A1 * | 8/2006 | Block et al. ..................... 455/78 |
| 2007/0060077 | A1 | 3/2007 | Qian |
| 2007/0075803 | A1 | 4/2007 | Kemmochi et al. |
| 2007/0190954 | A1 * | 8/2007 | Murakami et al. ........... 455/132 |
| 2008/0212552 | A1 * | 9/2008 | Fukamachi et al. ......... 370/343 |
| 2008/0292009 | A1 | 11/2008 | Deng et al. |
| 2009/0147763 | A1 | 6/2009 | Desai et al. |
| 2011/0210787 | A1 | 9/2011 | Lee et al. |

FOREIGN PATENT DOCUMENTS

| | | |
|---|---|---|
| CN | 101277123 A | 10/2008 |
| CN | 101316105 A | 12/2008 |
| CN | 101645713 A | 2/2010 |

* cited by examiner

MULTI-BAND MULTI-PATH RECEIVING AND TRANSMITTING DEVICE AND METHOD, AND BASE STATION SYSTEM

This application is a continuation of U.S. patent application Ser. No. 13/074,798, filed on Mar. 29, 2011, which is a continuation of International Application No. PCT/CN2011/070345, filed on Jan. 18, 2011, which designated the United States and was not published in English, and which claims priority to Chinese Patent Application No. 201010590971.8, filed on Dec. 15, 2010, which applications are herein incorporated by reference in their entireties.

TECHNICAL FIELD

The present invention relates to a mobile communication technology, and in particular, to a multi-band multi-path receiving and transmitting device and method, and a base station system.

BACKGROUND

In the field of mobile communications, since capacity demands are continuously expanded, a plurality of frequency band transceivers works simultaneously for one base station system; meanwhile, with the development of antenna technologies, frequency bands supported by antennas are also continuously extended, and currently the antennas can support 790 MHz to 960 MHz or 1710 MHz to 2690 MHz. when realizing multi-band multi-path receiving, an antenna and a feeder are shared by a plurality of single-band transceivers through an external multi-frequency combiner can be adopted.

In the prior art, more frequency bands need more single-band transceivers, which increases the material cost and the mounting cost of the base station system; and the jumper between the external multi-frequency combiner and the single-band transceiver increases signal loss, which results in the reduction of the coverage performance of the base station. Additionally, the external multi-frequency combiner also increases the material cost and the mounting cost of the base station system.

SUMMARY

Accordingly, embodiments of the present invention are directed to a multi-band multi-path receiving and transmitting device and method, and a base station system, to improve the coverage performance of a base station, and reduce the material cost and the mounting cost of a base station system.

In an embodiment, the present invention provides a multi-band multi-path receiving and transmitting device, where the device includes a broadband antenna, at least two multi-frequency couplers, a multi-band transceiver, and a signal processing module. The broadband antenna is configured to receive at least a first frequency band signal and a second frequency band signal, and to send the first frequency band signal and the second frequency band signal to the at least two multi-frequency couplers. The at least two multi-frequency couplers include a first multi-frequency coupler and a second multi-frequency coupler. The first multi-frequency coupler is configured to receive the first frequency band signal and the second frequency band signal sent by the broadband antenna, and send the first frequency band signal and the second frequency band signal to the multi-band transceiver. The second multi-frequency coupler is configured to receive the first frequency band signal and the second frequency band signal sent by the broadband antenna, and to send the first frequency band signal and the second frequency band signal to the multi-band transceiver. The multi-band transceiver includes at least two first frequency band receiving branches and at least two second frequency band receiving branches. The at least two first frequency band receiving branches are configured to receive the first frequency band signal sent by the first multi-frequency coupler and the second multi-frequency coupler, and to send the first frequency band signal to the signal processing module, and the at least two second frequency band receiving branches are configured to receive the second frequency band signal sent by the first multi-frequency coupler and the second multi-frequency coupler, and to send the second frequency band signal to the signal processing module. The signal processing module is configured to receive the first frequency band signal sent by the at least two first frequency band receiving branches, and process the first frequency band signal; and to receive the second frequency band signal sent by the at least two second frequency band receiving branches, and process the second frequency band signal.

In an embodiment, the present invention further provides a base station system, which includes the multi-band multi-path receiving and transmitting device.

In an embodiment, the present invention provides another multi-band multi-path receiving and transmitting device, where the device includes a broadband antenna, at least two multi-frequency couplers, two multi-band transceivers, and a signal processing module. The broadband antenna is configured to receive at least a first frequency band signal and a second frequency band signal, and send the first frequency band signal and the second frequency band signal to the at least two multi-frequency couplers. The at least two multi-frequency couplers include a first multi-frequency coupler and a second multi-frequency coupler, the first multi-frequency coupler is configured to receive the first frequency band signal and the second frequency band signal sent by the broadband antenna, and send the first frequency band signal and the second frequency band signal to the two multi-band transceivers, and the second multi-frequency coupler is configured to receive the first frequency band signal and the second frequency band signal sent by the broadband antenna, and send the first frequency band signal and the second frequency band signal to the two multi-band transceivers. The two multi-band transceivers include a first multi-band transceiver and a second multi-band transceiver, the first multi-band transceiver is configured to receive the first frequency band signal and the second frequency band signal sent by the first multi-frequency coupler, and send the first frequency band signal and the second frequency band signal to the signal processing module, and the second multi-band transceiver is configured to receive the first frequency band signal and the second frequency band signal sent by the second multi-frequency coupler, and send the first frequency band signal and the second frequency band signal to the signal processing module. The signal processing module is configured to receive the first frequency band signal and the second frequency band signal sent by the first multi-band transceiver, receive the first frequency band signal and the second frequency band signal sent by the second multi-band transceiver, and process the first frequency band signal received and the second frequency band signal received.

In an embodiment, the present invention further provides another base station system, which includes the multi-band multi-path receiving and transmitting device.

In an embodiment, the present invention provides yet another multi-band multi-path receiving and transmitting device, where the device includes a broadband antenna, at least two multi-frequency couplers, at least two single-band transceivers, and a signal processing module. The broadband antenna is configured to receive at least a first frequency band signal and a second frequency band signal, and send the first frequency band signal and the second frequency band signal to the at least two multi-frequency couplers. The at least two multi-frequency couplers include a first multi-frequency coupler and a second multi-frequency coupler, the first multi-frequency coupler is configured to receive the first frequency band signal and the second frequency band signal sent by the broadband antenna, and send the first frequency band signal and the second frequency band signal to the at least two single-band transceivers respectively, and the second multi-frequency coupler is configured to receive the first frequency band signal and the second frequency band signal sent by the broadband antenna, and send the first frequency band signal and the second frequency band signal to the at least two single-band transceivers respectively. The at least two single-band transceivers include a first frequency band transceiver and a second frequency band transceiver, the first multi-frequency coupler is built in the first frequency band transceiver, and the second multi-frequency coupler is built in the second frequency band transceiver, in which the first frequency band transceiver includes at least two first frequency band receiving branches, a first receiving branch group of the first frequency band is configured to receive the first frequency band signal sent by the first multi-frequency coupler, and send the first frequency band signal to the signal processing module, and a second receiving branch group of the first frequency band is configured to receive the first frequency band signal sent by the second multi-frequency coupler, and send the first frequency band signal to the signal processing module. The second frequency band transceiver includes at least two second frequency band receiving branches, a first receiving branch group of the second frequency band is configured to receive the second frequency band signal sent by the second multi-frequency coupler, and send the second frequency band signal to the signal processing module, and a second receiving branch group of the second frequency band is configured to receive the second frequency band signal sent by the first multi-frequency coupler, and send the second frequency band signal to the signal processing module. The signal processing module is configured to receive the first frequency band signal sent by the first frequency band receiving branch in the first frequency band transceiver, and process the first frequency band signal; and receive the second frequency band signal sent by the second frequency band receiving branch in the second frequency band transceiver, and process the second frequency band signal.

In an embodiment, the present invention further provides yet another base station system, which includes the multi-band multi-path receiving and transmitting device.

In an embodiment, the present invention further provides a multi-band multi-path receiving and transmitting method.

A multi-band transceiver receives a first frequency band signal and a second frequency band signal received by a broadband antenna through a first multi-frequency coupler, and receiving a first frequency band signal and a second frequency band signal received by the broadband antenna through the second multi-frequency coupler. The multi-band transceiver ends the first frequency band signal and the second frequency band signal received through the first multi-frequency coupler to a signal processing module, and sending the first frequency band signal and the second frequency band signal received through the second multi-frequency coupler to the signal processing module.

In an embodiment, the present invention further provides another multi-band multi-path receiving and transmitting method.

A first frequency band transceiver acquires a first frequency band signal received by a broadband antenna through a built-in first multi-frequency coupler, a first frequency band signal received by the broadband antenna through a second multi-frequency coupler built in a second frequency band transceiver. The first frequency band receiver also sends the first frequency band signal received through the first multi-frequency coupler and the second multi-frequency coupler to a signal processing module. The second frequency band transceiver acquires a second frequency band signal received by the broadband antenna through the built-in second multi-frequency coupler and a second frequency band signal received by the broadband antenna through the first multi-frequency coupler built in the first frequency band transceiver. The second frequency band receiver also sends the second frequency band signal received through the first multi-frequency coupler and the second multi-frequency coupler to a signal processing module.

It can be known from the technical solutions that, according to the embodiments of the present invention, the multi-band transceiver is adopted to decrease the number of the transceivers, thereby reducing the material cost and the mounting cost of the base station system. Alternatively, according to the embodiments of the present invention, by building the multi-frequency coupler in one single-band transceiver, only a small number of jumpers need to be connected with the receiving branch of another single-band transceiver, so that the loss of the received signal and the transmitted signal is reduced, thereby improving the coverage performance of the base station. Meanwhile, the multi-frequency coupler is built in the multi-band transceiver or the single-band transceiver, to further reduce the material cost and the mounting cost of the base station system.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are some embodiments of the present invention, and persons of ordinary skill in the art can derive other drawings from the accompanying drawings without creative efforts.

DETAILED DESCRIPTION OF ILLUSTRATIVE EMBODIMENTS

In order to make the objectives, the technical solutions, and the advantages of the present invention clearer, the technical solutions of the present invention are hereinafter described in detail with reference to the accompanying drawings. Apparently, the embodiments described below are for the exemplary purpose, without covering all embodiments of the present invention. Persons of ordinary skill in the art can derive other embodiments from the embodiments given herein without making any creative effort, and all such embodiments are covered in the protection scope of the present invention.

Figure 1:
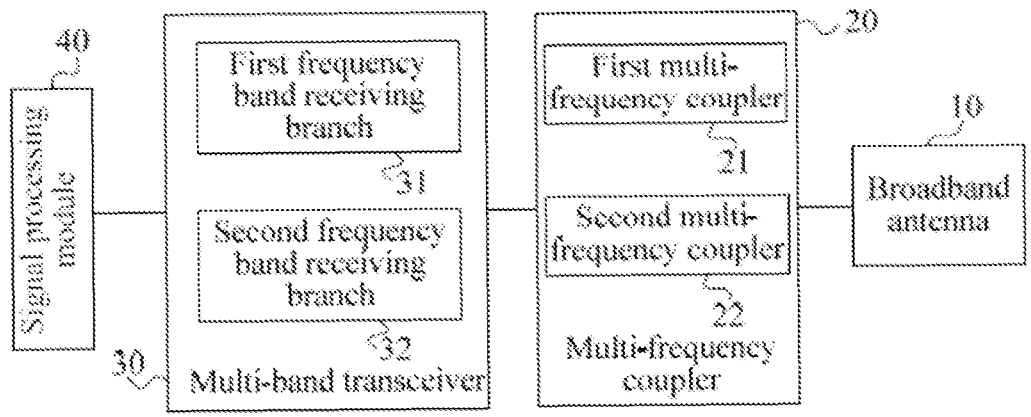
FIG. 1 is a schematic structural view of a multi-band multi-path receiving and transmitting device according to Embodiment 1 of the present invention.

FIG. 1 is a schematic structural view of a multi-band multi-path receiving and transmitting device according to Embodiment 1 of the present invention. As shown in FIG. 1, the multi-band multi-path receiving and transmitting device of this embodiment includes a broadband antenna 10; at least two multi-frequency couplers 20, including a first multi-frequency coupler 21 and a second multi-frequency coupler 22; a multi-band transceiver 30, including at least two first frequency band receiving branches 31 and at least two second frequency band receiving branches 32; and a signal processing module 40.

The broadband antenna 10 is configured to receive at least a first frequency band signal and a second frequency band signal, and send the first frequency band signal and the second frequency band signal to the at least two multi-frequency couplers 20.

The first multi-frequency coupler 21 is configured to receive the first frequency band signal and the second frequency band signal sent by the broadband antenna 10, and send the first frequency band signal and the second frequency band signal to the multi-band transceiver 30. The second multi-frequency coupler 22 is configured to receive the first frequency band signal the second frequency band signal sent by the broadband antenna 10, and send the first frequency band signal and the second frequency band signal to the multi-band transceiver 30.

The at least two first frequency band receiving branches 31 are configured to receive the first frequency band signal sent by the first multi-frequency coupler 21 and the second multi-frequency coupler 22, and send the first frequency band signal to the signal processing module 40. The at least two second frequency band receiving branches 32 are configured to receive the second frequency band signal sent by the first multi-frequency coupler 21 and the second multi-frequency coupler 22, and send the second frequency band signal to the signal processing module 40.

The signal processing module 40 is configured to receive the first frequency band signal sent by the at least two first frequency band receiving branches 31, and process the first frequency band signal; and receive the second frequency band signal sent by the at least two second frequency band receiving branches 32, and process the second frequency band signal.

During specific implementation, the signal processing module may be a baseband processing module. When passing through the first frequency band receiving branch 31 and/or the second frequency band receiving branch 32, the received signal received by the antenna (that is, a radio frequency signal) is subject to intermediate radio frequency processing, so the baseband processing module may directly perform baseband processing on the signal sent by the first frequency band receiving branch 31 and/or the second frequency band receiving branch 32.

In this embodiment, the multi-frequency coupler is disposed external to the multi-band transceiver, so as to decrease the number of the transceivers, thereby reducing the material cost and the mounting cost of the base station system.

Further, the at least two multi-frequency couplers 20 in this embodiment may be built in the multi-band transceiver 30. For the external multi-frequency combiner, the requirement of minimal isolation (generally about 50 dB) between signals at different frequency bands sharing the same broadband antenna needs to be considered, and the isolation index of the multi-frequency combiner can be specifically satisfied with a metal cavity filter, in which each frequency band needs 4 to 5 resonance cavities. However, the multi-frequency coupler built in the multi-band transceiver in the embodiment of the present invention may be jointly designed as a whole with a duplexer of the multi-band transceiver (which may be realized with the metal cavity filter), and each frequency band satisfies the isolation requirement only in need of adding 1 to 2 resonance cavities. Thereby, the number of cavities of the metal cavity filter is decreased, and the loss of the received signal and the transmitted signal is reduced.

In this embodiment, by utilizing the characteristic that the broadband antenna covers a plurality of frequency bands, corresponding to each antenna branch, in a multi-frequency coupling manner, received signals at all frequency bands are received in the multi-band transceiver, and are shared by the receiving branch of each frequency band, thereby realizing multi-band multi-path receiving. In the multi-band multi-path receiving and transmitting device of this embodiment, since the multi-frequency coupler is built in the multi-band transceiver, a jumper does not need to be connected with the receiving branch/transmitting branch of the multi-band transceiver, so that the loss of the received signal and the transmitted signal is reduced, thereby improving the coverage performance of the base station. Meanwhile, since the multi-frequency coupler is built in the multi-band transceiver, the material cost and the mounting cost of the base station system are also reduced.

Further, the broadband antenna 10 in this embodiment includes at least one antenna branch, and one of the antenna branches receives at most a transmitted signal transmitted by one transmitting branch at one frequency band of the multi-band transceiver through one multi-frequency coupler, so that transmitted signals at different frequency bands do not share the same antenna branch, and an antenna downtilt angle of a corresponding antenna can be independently regulated for downlink coverage at different frequency bands.

In order to make the method according to the embodiment of the present invention clearer, a dual-polarized antenna realizing dual-band multi-path receiving is exemplified hereinafter.

FIGS. 2 to 5 are schematic views of four implementation schemes of the multi-band multi-path receiving and transmitting device for one dual-band transceiver according to Embodiment 1 of the present invention, which are illustrated in detail as follows.

Figure 2:
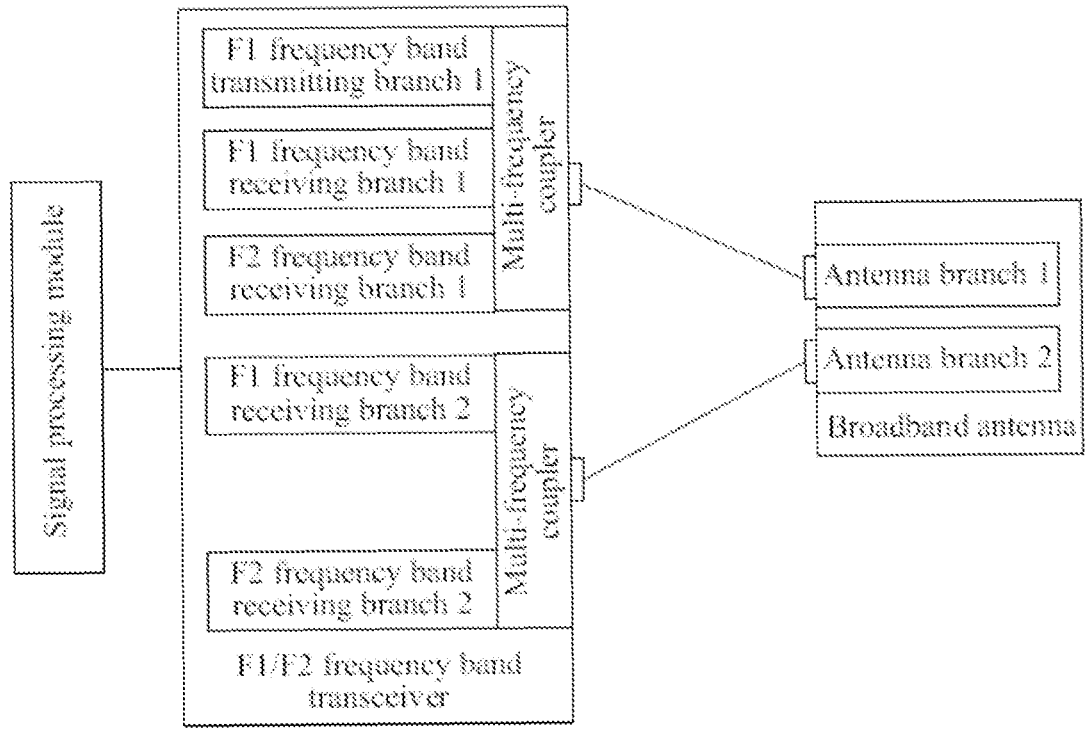
FIG. 2 is a schematic view of F1 frequency band one transmission and two receiving (1T2R) and F2 frequency band two receiving (2R) realized by the multi-band multi-path receiving and transmitting device according to Embodiment 1 of the present invention.

FIG. 2 is a schematic view of F1 frequency band 1T2R and F2 frequency band 2R realized by the multi-band multi-path receiving and transmitting device according to Embodiment 1 of the present invention.

As shown in FIG. 2, an F1/F2 frequency band transceiver supports F1 frequency band 1T2R and F2 frequency band 2R. An F1 frequency band transmitting branch 1, an F1 frequency band receiving branch 1, and an F2 frequency band receiving branch 1 of the F1/F2 frequency band transceiver share one antenna port of the F1/F2 frequency band transceiver through a multi-frequency coupler, so that a connection is realized, and the F1 frequency band transmitting branch 1, the F1 frequency band receiving branch 1, and the F2 frequency band receiving branch 1 share one antenna branch 1.

An F1 frequency band receiving branch 2 and an F2 frequency band receiving branch 2 of the F1/F2 frequency band transceiver share another antenna port of the F1/F2 frequency band transceiver through a multi-frequency coupler, so that a connection is realized, and the F1 frequency band receiving branch 2 and the F2 frequency band receiving branch 2 share one antenna branch 2.

Figure 3:
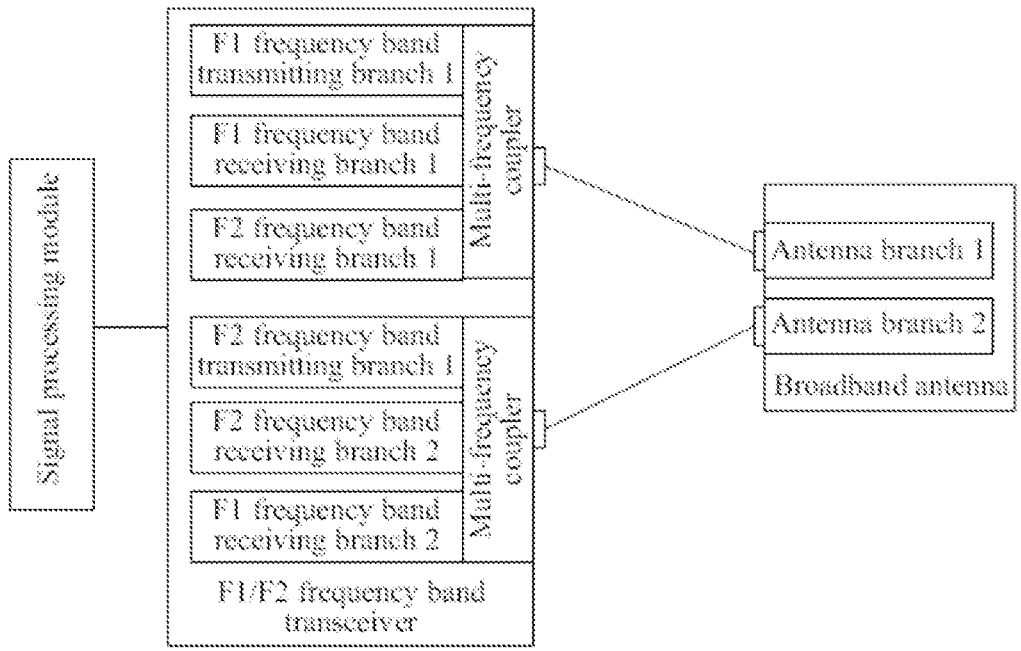
FIG. 3 is a schematic view of F1 frequency band 1T2R and F2 frequency band 1T2R realized by the multi-band multi-path receiving and transmitting device according to Embodiment 1 of the present invention.

FIG. 3 is a schematic view of F1 frequency band 1T2R and F2 frequency band 1T2R realized by the multi-band multi-path receiving and transmitting device according to Embodiment 1 of the present invention.

As shown in FIG. 3, an F1/F2 frequency band transceiver supports F1 frequency band 1T2R and F2 frequency band 1T2R. An F1 frequency band transmitting branch 1, an F1 frequency band receiving branch 1, and an F2 frequency band receiving branch 1 of the F1/F2 frequency band transceiver share one antenna port of the F1/F2 frequency band transceiver through a multi-frequency coupler, so that a connection is realized, and the F1 frequency band transmitting branch 1, the F1 frequency band receiving branch 1, and the F2 frequency band receiving branch 1 share one antenna branch 1.

An F2 frequency band transmitting branch 1, an F2 frequency band receiving branch 2, and an F1 frequency band receiving branch 2 of the F1/F2 frequency band transceiver share another antenna port of the F1/F2 frequency band transceiver through a multi-frequency coupler, so that a connection is realized, and the F2 frequency band transmitting branch 1, the F2 frequency band receiving branch 2, and the F1 frequency band receiving branch 2 share one antenna branch 2.

Figure 4:
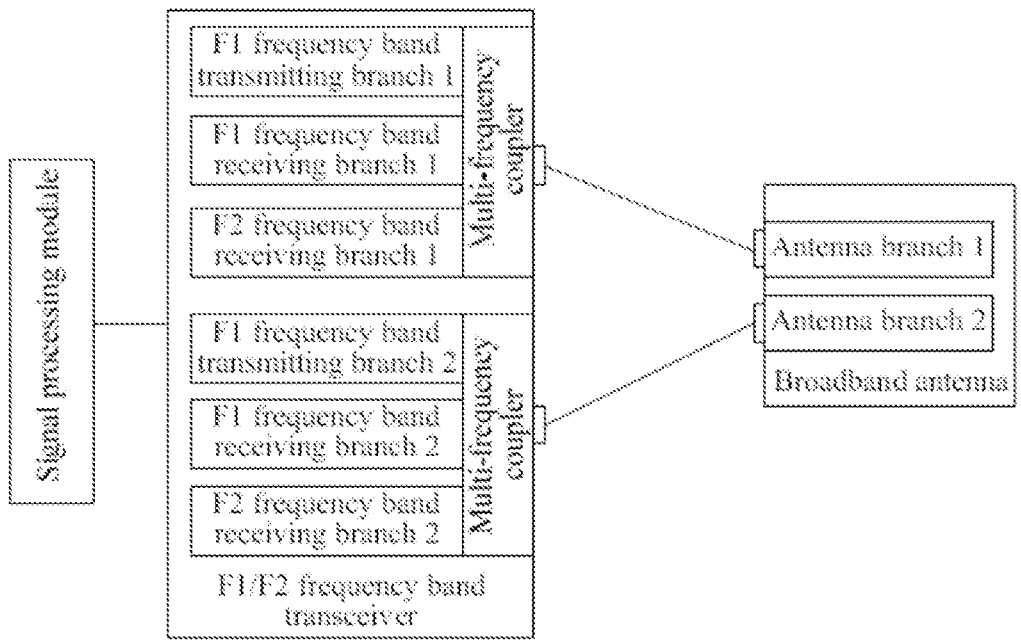
FIG. 4 is a schematic view of F1 frequency band two transmission and two receiving (2T2R) and F2 frequency band 2R realized by the multi-band multi-path receiving and transmitting device according to Embodiment 1 of the present invention.

FIG. 4 is a schematic view of F1 frequency band 2T2R and F2 frequency band 2R realized by the multi-band multi-path receiving and transmitting device according to Embodiment 1 of the present invention.

As shown in FIG. 4, an F1/F2 frequency band transceiver supports F1 frequency band 2T2R and F2 frequency band 2R. An F1 frequency band transmitting branch 1, an F1 frequency band receiving branch 1, and an F2 frequency band receiving branch 1 of the F1/F2 frequency band transceiver share one antenna port of the F1/F2 frequency band transceiver through a multi-frequency coupler, so that a connection is realized, and the F1 frequency band transmitting branch 1, the F1 frequency band receiving branch 1, and the F2 frequency band receiving branch 1 share one antenna branch 1.

An F1 frequency band transmitting branch 2, an F1 frequency band receiving branch 2, and an F2 frequency band receiving branch 2 of the F1/F2 frequency band transceiver share one antenna port of the F1/F2 frequency band transceiver through a multi-frequency coupler, so that a connection is realized, and the F1 frequency band transmitting branch 2, the F1 frequency band receiving branch 2, and the F2 frequency band receiving branch 2 share one antenna branch 2.

Figure 5:
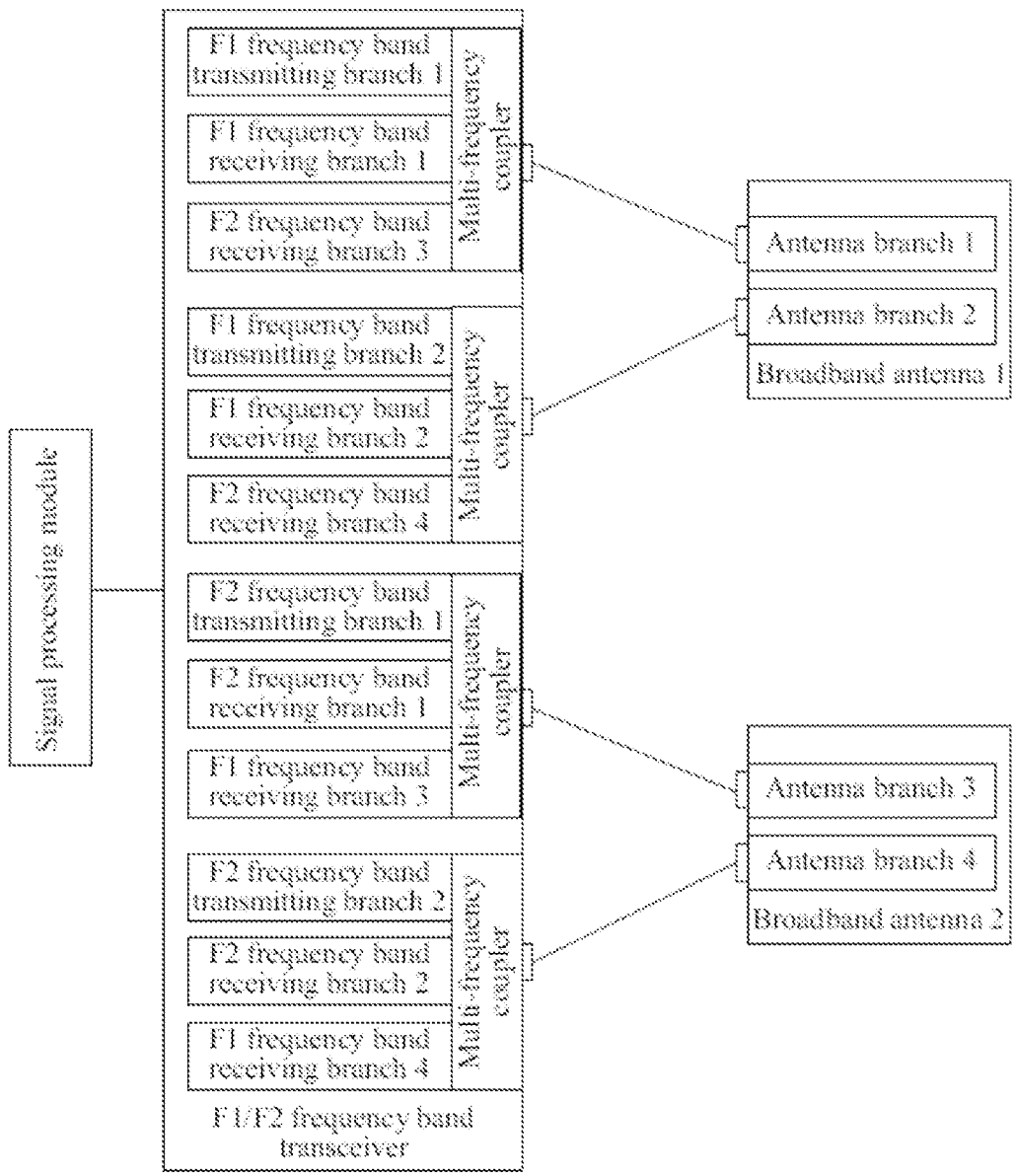
FIG. 5 is a schematic view of F1 frequency band two transmission and four receiving (2T4R) and F2 frequency band 2T4R realized by the multi-band multi-path receiving and transmitting device according to Embodiment 1 of the present invention.

FIG. 5 is a schematic view of F1 frequency band 2T4R and F2 frequency band 2T4R realized by the multi-band multi-path receiving and transmitting device according to Embodiment 1 of the present invention.

As shown in FIG. 5, an F1/F2 frequency band transceiver supports F1 frequency band 2T4R and F2 frequency band 2T4R. An F1 frequency band transmitting branch 1, an F1 frequency band receiving branch 1, and an F2 frequency band receiving branch 3 of the F1/F2 frequency band transceiver share one antenna port of the F1/F2 frequency band transceiver through a multi-frequency coupler, so that a connection is realized, and the F1 frequency band transmitting branch 1, the F1 frequency band receiving branch 1, and the F2 frequency band receiving branch 3 share one antenna branch 1.

An F1 frequency band transmitting branch 2, an F1 frequency band receiving branch 2, and an F2 frequency band receiving branch 4 of the F1/F2 frequency band transceiver share another antenna port of the F1/F2 frequency band transceiver through a multi-frequency coupler, so that a connection is realized, and the F1 frequency band transmitting branch 2, the F1 frequency band receiving branch 2, and the F2 frequency band receiving branch 4 share one antenna branch 2.

An F2 frequency band transmitting branch 1, an F2 frequency band receiving branch 1, and an F1 frequency band receiving branch 3 of the F1/F2 frequency band transceiver share another antenna port of the F1/F2 frequency band transceiver through a multi-frequency coupler, so that a connection is realized, and the F2 frequency band transmitting branch 1, the F2 frequency band receiving branch 1, and the F1 frequency band receiving branch 3 share one antenna branch 3.

An F2 frequency band transmitting branch 2, an F2 frequency band receiving branch 2, and an F1 frequency band receiving branch 4 of the F1/F2 frequency band transceiver share another antenna port of the F1/F2 frequency band transceiver through a multi-frequency coupler, so that a connection is realized, and the F2 frequency band transmitting branch 2, the F2 frequency band receiving branch 2, and the F1 frequency band receiving branch 4 share one antenna branch 4.

Figure 6:
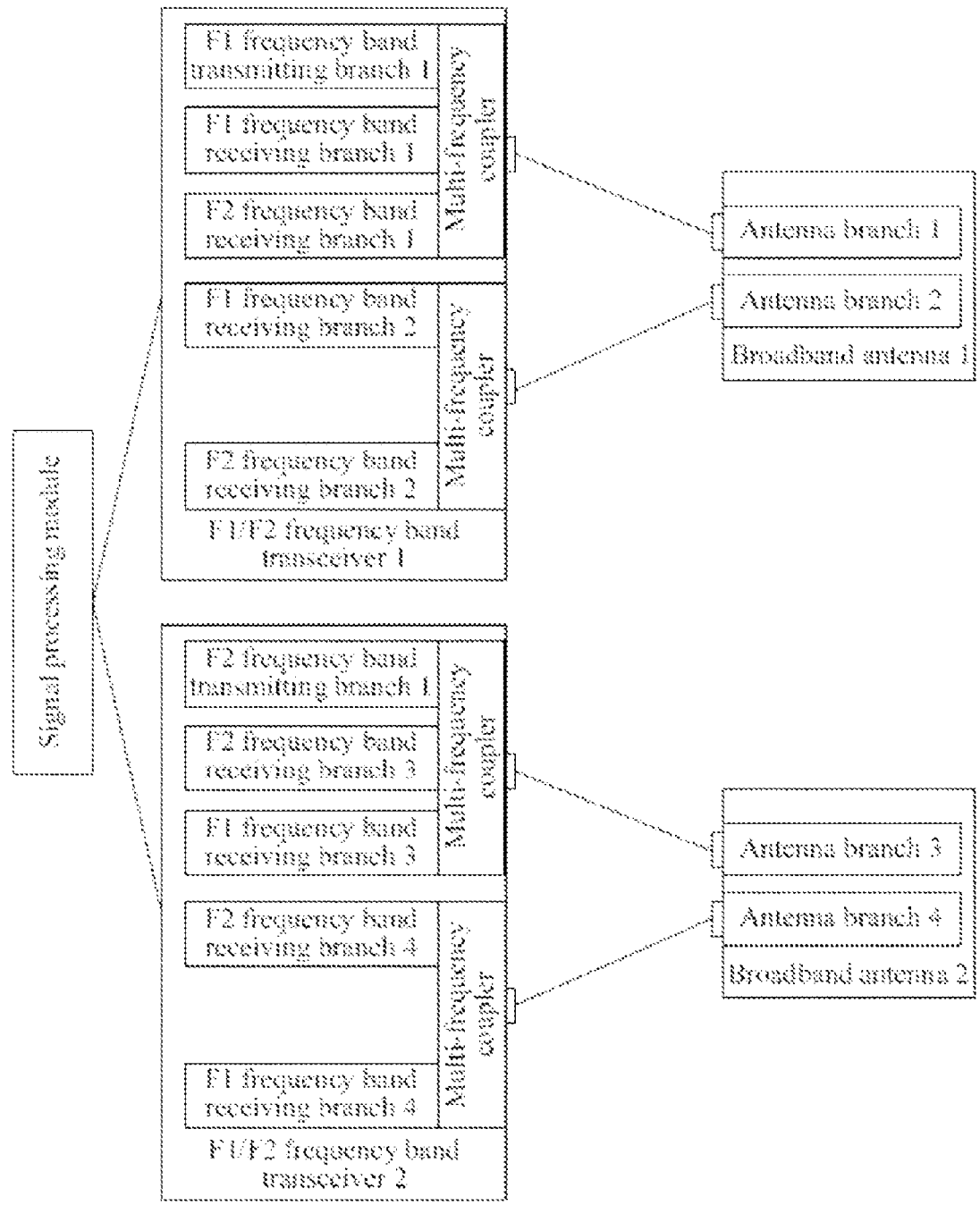
FIG. 6 is a schematic view of F1 frequency band one transmission and four receiving (1T4R) and F2 frequency band 1T4R realized by the multi-band multi-path receiving and transmitting device according to Embodiment 1 of the present invention.
Figure 7:
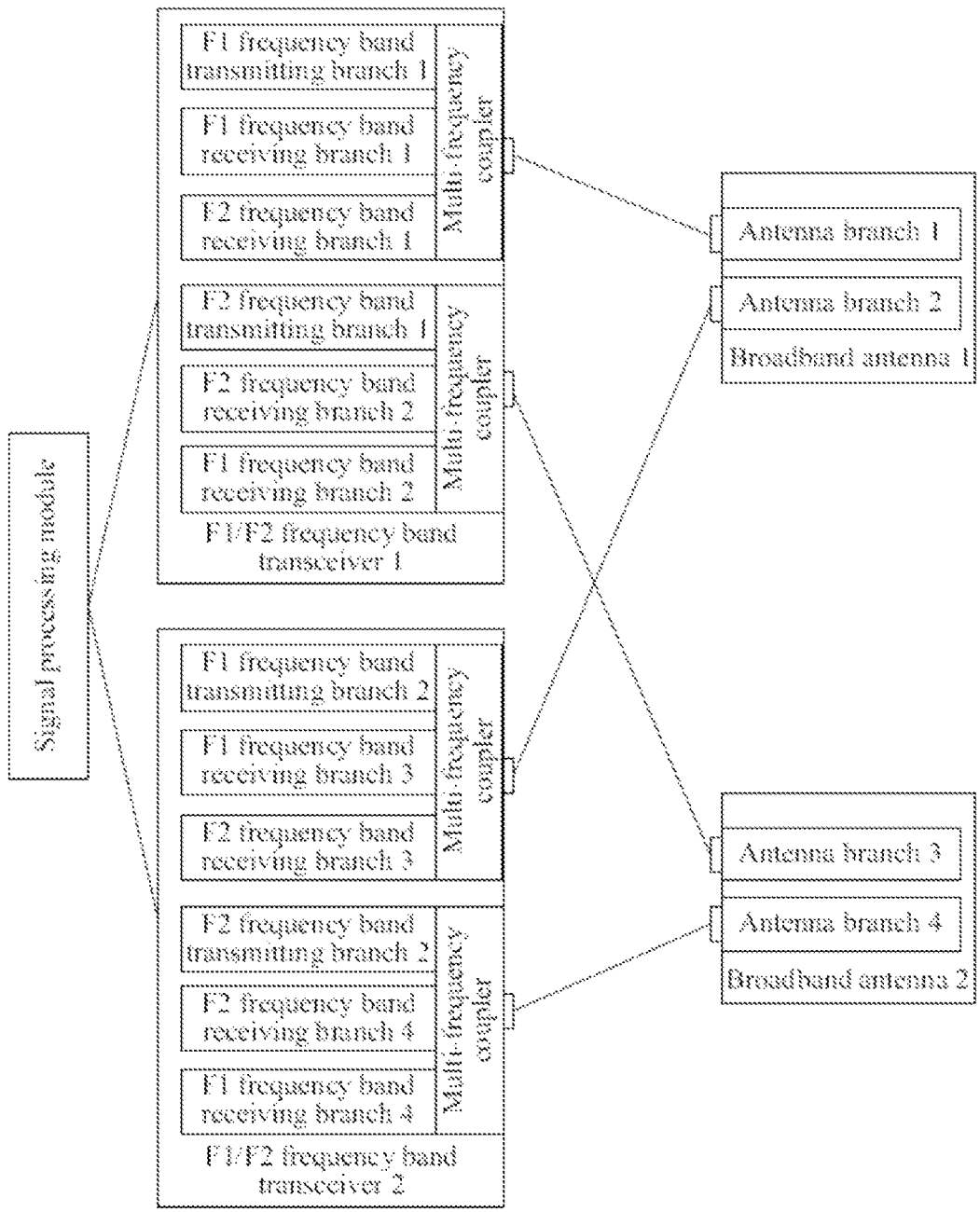
FIG. 7 is a schematic view of F1 frequency band 2T4R and F2 frequency band 2T4R realized by the multi-band multi-path receiving and transmitting device according to Embodiment 1 of the present invention.
Figure 8:
FIG. 8 is another schematic view of F1 frequency band 2T4R and F2 frequency band 2T4R realized by the multi-band multi-path receiving and transmitting device according to Embodiment 1 of the present invention.

FIGS. 6 to 8 are schematic views of three implementation schemes of the multi-band multi-path receiving and transmitting device for two dual-band transceivers according to Embodiment 1 of the present invention, which are illustrated in detail as follows.

FIG. 6 is a schematic view of F1 frequency band 1T4R and F2 frequency band 1T4R realized by the multi-band multi-path receiving and transmitting device according to Embodiment 1 of the present invention.

As shown in FIG. 6, an F1/F2 frequency band transceiver 1 and an F1/F2 frequency band transceiver 2 support F1 frequency band 1T4R and F2 frequency band 1T4R. An F1 frequency band transmitting branch 1, an F1 frequency band receiving branch 1, and an F2 frequency band receiving branch 1 of the F1/F2 frequency band transceiver 1 share one antenna port of the F1/F2 frequency band transceiver 1 through a multi-frequency coupler, so that a connection is realized, and the F1 frequency band transmitting branch 1, the F1 frequency band receiving branch 1, and the F2 frequency band receiving branch 1 share one antenna branch 1.

An F1 frequency band receiving branch 2 and an F2 frequency band receiving branch 2 of the F1/F2 frequency band transceiver 1 share another antenna port of the F1/F2 frequency band transceiver 1 through a multi-frequency coupler, so that a connection is realized, and the F1 frequency band receiving branch 2 and the F2 frequency band receiving branch 2 share one antenna branch 2.

An F2 frequency band transmitting branch 1, an F2 frequency band receiving branch 3, and an F1 frequency band receiving branch 3 of the F1/F2 frequency band transceiver 2 share one antenna port of the F1/F2 frequency band transceiver 2 through a multi-frequency coupler, so that a connection is realized, and the F2 frequency band transmitting branch 1, the F2 frequency band receiving branch 3, and the F1 frequency band receiving branch 3 share one antenna branch 3.

An F2 frequency band receiving branch 4 and an F1 frequency band receiving branch 4 of the F1/F2 frequency band transceiver 2 share another antenna port of the F1/F2 frequency band transceiver 2 through a multi-frequency coupler, so that a connection is realized, and the F2 frequency band receiving branch 4 and the F1 frequency band receiving branch 4 share one antenna branch 4.

FIG. 7 is a schematic view of F1 frequency band 2T4R and F2 frequency band 2T4R realized by the multi-band multi-path receiving and transmitting device according to Embodiment 1 of the present invention.

As shown in FIG. 7, an F1/F2 frequency band transceiver 1 and an F1/F2 frequency band transceiver 2 support F1 frequency band 2T4R and F2 frequency band 2T4R. An F1 frequency band transmitting branch 1, an F1 frequency band receiving branch 1, and an F2 frequency band receiving branch 1 of the F1/F2 frequency band transceiver 1 share one antenna port of the F1/F2 frequency band transceiver 1 through a multi-frequency coupler, so that a connection is realized, and the F1 frequency band transmitting branch 1, the F1 frequency band receiving branch 1, and the F2 frequency band receiving branch 1 share one antenna branch 1.

An F2 frequency band transmitting branch 1, an F2 frequency band receiving branch 2, and an F1 frequency band receiving branch 2 of the F1/F2 frequency band transceiver 1 share another antenna port of the F1/F2 frequency band transceiver 1 through a multi-frequency coupler, so that a connection is realized, and the F2 frequency band transmitting branch 1, the F2 frequency band receiving branch 2, and the F1 frequency band receiving branch 2 share one antenna branch 2.

An F1 frequency band transmitting branch 2, an F1 frequency band receiving branch 3, and an F2 frequency band receiving branch 3 of the F1/F2 frequency band transceiver 2 share one antenna port of the F1/F2 frequency band transceiver 2 through a multi-frequency coupler, so that a connection is realized, and the F1 frequency band transmitting branch 2, the F1 frequency band receiving branch 3, and the F2 frequency band receiving branch 3 share one antenna branch 3.

An F2 frequency band transmitting branch 2, an F2 frequency band receiving branch 4, and an F1 frequency band receiving branch 4 of the F1/F2 frequency band transceiver 2 share another antenna port of the F1/F2 frequency band transceiver 2 through a multi-frequency coupler, so that a connection is realized, and the F2 frequency band transmitting branch 2, the F2 frequency band receiving branch 4, and the F1 frequency band receiving branch 4 share one antenna branch 4.

FIG. 8 is another schematic view of F1 frequency band 2T4R and F2 frequency band 2T4R realized by the multi-band multi-path receiving and transmitting device according to Embodiment 1 of the present invention.

As shown in FIG. 8, an F1/F2 frequency band transceiver 1 and an F1/F2 frequency band transceiver 2 support F1 frequency band 2T4R and F2 frequency band 2T4R. An F1 frequency band transmitting branch 1, an F1 frequency band receiving branch 1, and an F2 frequency band receiving branch 1 of the F1/F2 frequency band transceiver 1 share one antenna port of the F1/F2 frequency band transceiver 1 through a multi-frequency coupler, so that a connection is realized, and the F1 frequency band transmitting branch 1, the F1 frequency band receiving branch 1, and the F2 frequency band receiving branch 1 share one antenna branch 1.

An F1 frequency band transmitting branch 1, an F1 frequency band receiving branch 2, and an F2 frequency band receiving branch 2 of the F1/F2 frequency band transceiver 1 share another antenna port of the F1/F2 frequency band transceiver 1 through a multi-frequency coupler, so that a connection is realized, and the F1 frequency band transmitting branch 1, the F1 frequency band receiving branch 2, and the F2 frequency band receiving branch 2 share one antenna branch 2.

An F2 frequency band transmitting branch 1, an F2 frequency band receiving branch 3, and an F1 frequency band receiving branch 3 of the F1/F2 frequency band transceiver 2 share one antenna port of the F1/F2 frequency band transceiver 2 through a multi-frequency coupler, so that a connection is realized, and the F2 frequency band transmitting branch 1, the F2 frequency band receiving branch 3, and the F1 frequency band receiving branch 3 share one antenna branch 3.

An F2 frequency band transmitting branch 2, an F2 frequency band receiving branch 4, and an F1 frequency band receiving branch 4 of the F1/F2 frequency band transceiver 2 share another antenna port of the F1/F2 frequency band transceiver 2 through a multi-frequency coupler, so that a connection is realized, and the F2 frequency band transmitting branch 2, the F2 frequency band receiving branch 4, and the F1 frequency band receiving branch 4 share one antenna branch 4.

Further, in this embodiment, if the receiving at more frequency bands needs to be realized, a receiving branch at a corresponding frequency band can be added under each multi-frequency coupler.

In an embodiment, the present invention further provides a base station system, which includes the multi-band multi-path receiving and transmitting device according to Embodiment 1 of the present invention, and specifically, includes the multi-band multi-path receiving and transmitting device as shown in FIGS. 1 to 8.

Figure 9:
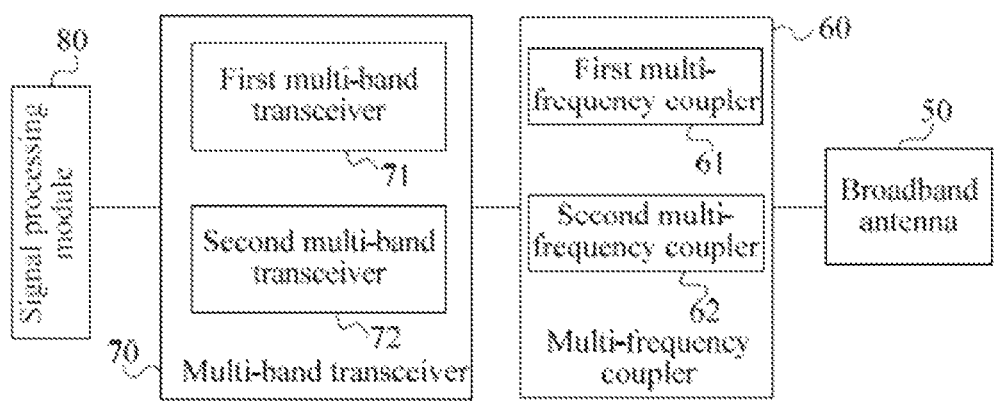
FIG. 9 is a schematic structural view of another multi-band multi-path receiving and transmitting device according to Embodiment 2 of the present invention.

FIG. 9 is a schematic structural view of another multi-band multi-path receiving and transmitting device according to Embodiment 2 of the present invention. As shown in FIG. 9, the multi-band multi-path receiving and transmitting device of this embodiment includes a broadband antenna 50; at least two multi-frequency couplers 60, including a first multi-frequency coupler 61 and a second multi-frequency coupler 62; two multi-band transceivers 70, including a first multi-band transceiver 71 and a second multi-band transceiver 72; and a signal processing module 80.

The broadband antenna 50 is configured to receive at least a first frequency band signal and a second frequency band signal, and send the first frequency band signal and the second frequency band signal to the at least two multi-frequency couplers 60.

The first multi-frequency coupler 61 is configured to receive the first frequency band signal and the second frequency band signal sent by the broadband antenna 50, and send the first frequency band signal and the second frequency band signal to the two multi-band transceivers 70, and the second multi-frequency coupler 62 is configured to receive the first frequency band signal and the second frequency band signal sent by the broadband antenna 50, and send the first frequency band signal and the second frequency band signal to the two multi-band transceivers 70.

The first multi-band transceiver 71 is configured to receive the first frequency band signal and the second frequency band signal sent by the first multi-frequency coupler 61, and send the first frequency band signal and the second frequency band signal to the signal processing module 80, and the second multi-band transceiver 72 is configured to receive the first frequency band signal and the second frequency band signal sent by the second multi-frequency coupler 62, and send the first frequency band signal and the second frequency band signal to the signal processing module 80.

The signal processing module 80 is configured to receive the first frequency band signal and the second frequency band signal sent by the first multi-band transceiver 71, receive the first frequency band signal and the second frequency band signal sent by the second multi-band transceiver 72, and process the first frequency band signal and the second frequency band signal.

During specific implementation, the signal processing module 80 may be a baseband processing module. When passing through the first multi-band transceiver 71 and/or the second multi-band transceiver 72, the received signal received by the antenna (that is, a radio frequency signal) is subject to intermediate radio frequency processing, so the baseband processing module may directly perform baseband processing on the signal sent by the first multi-band transceiver 71 and/or the second multi-band transceiver 72.

In this embodiment, the multi-frequency coupler is disposed external to the multi-band transceiver, so as to decrease the number of the transceivers, thereby reducing the material cost and the mounting cost of the base station system.

Further, in this embodiment, the first multi-frequency coupler 61 is built in the first multi-band transceiver 71, and the second multi-frequency coupler 62 is built in the second multi-band transceiver 72. For the external multi-frequency combiner, the requirement of minimal isolation (generally about 50 dB) between signals at different frequency bands sharing the same broadband antenna needs to be considered, and the isolation index of the multi-frequency combiner can be specifically satisfied with a metal cavity filter, in which each frequency band needs 4 to 5 resonance cavities. However, the multi-frequency coupler built in the multi-band transceiver in the embodiment of the present invention may be jointly designed as a whole with a duplexer of the multi-band transceiver (which may be realized with the metal cavity filter), and each frequency band satisfies the isolation requirement only in need of adding 1 to 2 resonance cavities. Thereby, the number of cavities of the metal cavity filter is decreased, and the loss of the received signal and the transmitted signal is reduced.

In this embodiment, by utilizing the characteristic that the broadband antenna covers a plurality of frequency bands, corresponding to each antenna branch, in a multi-frequency coupling manner, received signals at all frequency bands are received in the multi-band transceiver, and are shared by the receiving branch of each frequency band, thereby realizing multi-band multi-path receiving. In the multi-band multi-path receiving and transmitting device of this embodiment, since the multi-frequency coupler is built in the multi-band transceiver, a jumper does not need to be connected with the receiving branch/transmitting branch of the multi-band transceiver, so that the loss of the received signal and the transmitted signal is reduced, thereby improving the coverage performance of the base station. Meanwhile, since the multi-frequency coupler is built in the multi-band transceiver, the material cost and the mounting cost of the base station system are also reduced.

Further, the broadband antenna 50 in this embodiment includes at least one antenna branch, and one of the antenna branches receives at most a transmitted signal transmitted by one transmitting branch at one frequency band of the multi-band transceiver through one multi-frequency coupler.

In an embodiment, the present invention further provides a base station system, which includes the multi-band multi-path receiving and transmitting device according to Embodiment 2 of the present invention, and specifically, includes the multi-band multi-path receiving and transmitting device as shown in FIG. 9.

Figure 10:
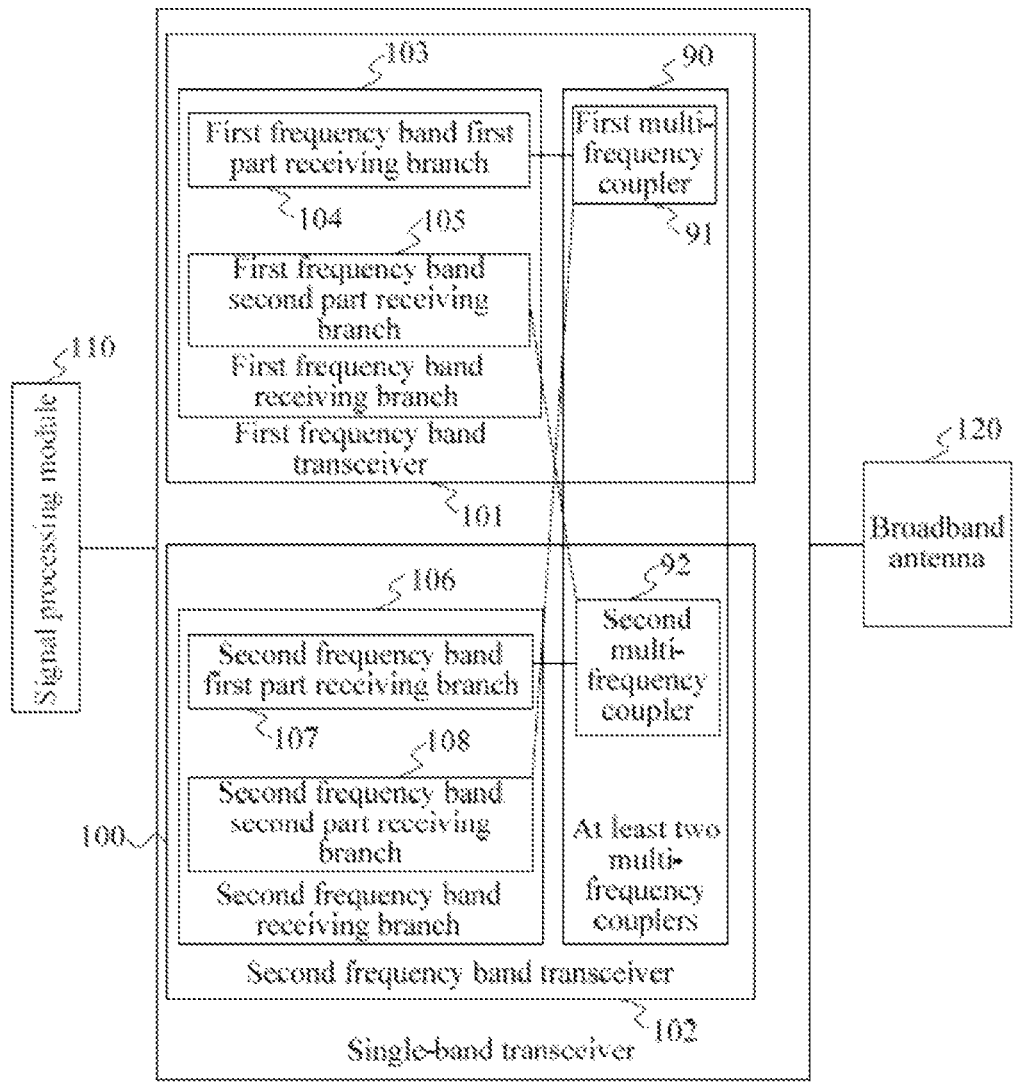
FIG. 10 is a schematic structural view of yet another multi-band multi-path receiving and transmitting device according to Embodiment 3 of the present invention.

FIG. 10 is a schematic structural view of yet another multi-band multi-path receiving and transmitting device according to Embodiment 3 of the present invention. As shown in FIG. 10, the multi-band multi-path receiving and transmitting device of this embodiment includes a broadband antenna 120; at least two multi-frequency couplers 90, including a first multi-frequency coupler 91 and a second multi-frequency coupler 92; at least two single-band transceivers 100, including a first frequency band transceiver 101 and a second frequency band transceiver 102, in which the first multi-frequency coupler 91 is built in the first frequency band transceiver 101, and the second multi-frequency coupler 92 is built in the second frequency band transceiver 102; and a signal processing module 110.

The broadband antenna 120 is configured to receive at least a first frequency band signal and a second frequency band signal, and send the first frequency band signal and the second frequency band signal to the at least two multi-frequency couplers 90.

The first multi-frequency coupler 91 is configured to receive the first frequency band signal and the second frequency band signal sent by the broadband antenna 80, and send the first frequency band signal and the second frequency band signal to the at least two single-band transceivers 100 respectively. The second multi-frequency coupler 92 is configured to receive the first frequency band signal and the second frequency band signal sent by the broadband antenna 80, and send the first frequency band signal and the second frequency band signal to the at least two single-band transceivers 100 respectively.

The first frequency band transceiver 101 includes at least two first frequency band receiving branches 103, and the at least two first frequency band receiving branches 103 include a first receiving branch group of the first frequency band 104 and a second receiving branch group of the first frequency band 105. The first receiving branch group of the first frequency band 104 is configured to receive the first frequency band signal sent by the first multi-frequency coupler 91, and send the first frequency band signal to the signal processing module 110. The second receiving branch group of the first frequency band 105 is configured to receive the first frequency band signal sent by the second multi-frequency coupler 92, and send the first frequency band signal to the signal processing module 110.

The second frequency band transceiver 102 includes at least two second frequency band receiving branches 106, and the at least two second frequency band receiving branches 106 include a first receiving branch group of the second frequency band 107 and a second receiving branch group of the second frequency band 108. The first receiving branch group of the second frequency band 107 is configured to receive the second frequency band signal sent by the second multi-frequency coupler 92, and send the second frequency band signal to the signal processing module 110. The second receiving branch group of the second frequency band 108 is configured to receive the second frequency band signal sent by the first multi-frequency coupler 91, and send the second frequency band signal to the signal processing module 110.

The signal processing module 110 is configured to receive the first frequency band signal sent by the first frequency band receiving branch 103 in the first frequency band transceiver 101, and process the first frequency band signal; receive the second frequency band signal sent by the second frequency band receiving branch 106 in the second frequency band transceiver 102, and process the second frequency band signal.

During specific implementation, the signal processing module may be a baseband processing module. When passing through the first frequency band receiving branch 103 in the first frequency band transceiver 101 and/or the second frequency band receiving branch 106 in the second frequency band transceiver 102, the received signal received by the antenna (that is, a radio frequency signal) is subject to intermediate radio frequency processing, so the baseband processing module may directly perform baseband processing on the signal sent by the first frequency band receiving branch 103 in the first frequency band transceiver 101 and/or the second frequency band receiving branch 106 in the second frequency band transceiver 102.

In this embodiment, by building the multi-frequency coupler in one single-band transceiver, only a small number of jumpers need to be connected with the receiving branch of another single-band transceiver, so that the loss of the received signal and the transmitted signal is reduced, thereby improving the coverage performance of the base station. Meanwhile, the multi-frequency coupler is built in the multi-band transceiver or the single-band transceiver, to further reduce the material cost and the mounting cost of the base station system.

For the external multi-frequency combiner, the requirement of minimal isolation (generally about 50 dB) between signals at different frequency bands sharing the same broadband antenna needs to be considered, and the isolation index of the multi-frequency combiner can be specifically satisfied with a metal cavity filter, in which each frequency band needs 4 to 5 resonance cavities. However, the multi-frequency coupler built in the multi-band transceiver in the embodiment of the present invention may be jointly designed as a whole with a duplexer of the multi-band transceiver (which may be realized with the metal cavity filter), and each frequency band satisfies the isolation requirement only in need of adding 1 to 2 resonance cavities. Thereby, the number of cavities of the metal cavity filter is decreased, and the loss of the received signal and the transmitted signal is reduced.

In this embodiment, by utilizing the characteristic that the broadband antenna covers a plurality of frequency bands, corresponding to each antenna branch, in a multi-frequency coupling and jumper manner, received signals at all frequency bands are received in the single-band transceiver, and are shared by the receiving branch of each frequency band, thereby realizing multi-band multi-path receiving. In the multi-band multi-path receiving and transmitting device of this embodiment, since the multi-frequency coupler is built in the single-band transceiver, only several jumpers need to be connected with the receiving branch of the single-band transceiver, so that the loss of the received signal and the transmitted signal is reduced, thereby improving the coverage performance of the base station. Meanwhile, since the multi-frequency coupler is built in the single-band transceiver, the material cost and the mounting cost of the base station system are also reduced.

Further, the broadband antenna 120 in this embodiment includes at least one antenna branch, and one of the antenna branches receives at most a transmitted signal transmitted by one transmitting branch at one frequency band of the multi-band transceiver through one multi-frequency coupler, so that transmitted signals at different frequency bands do not share the same antenna branch, and an antenna downtilt angle of a corresponding antenna can be independently regulated for downlink coverage at different frequency bands.

Figure 11:
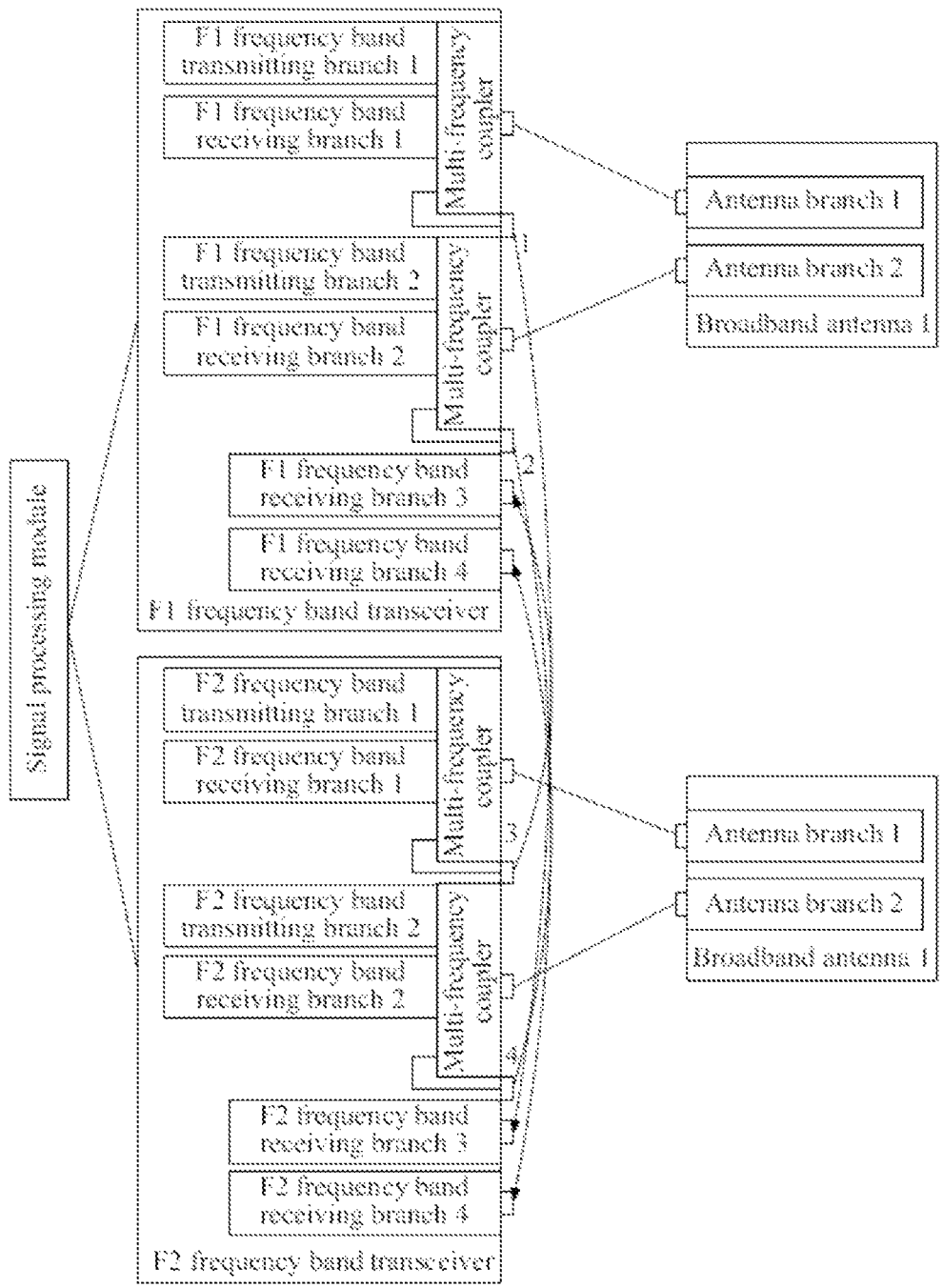
FIG. 11 is a schematic view of F1 frequency band 2T4R and F2 frequency band 2T4R realized by the multi-band multi-path receiving and transmitting device according to Embodiment 3 of the present invention.

In order to make the method according to the embodiment of the present invention clearer, a dual-polarized antenna realizing dual-band multi-path receiving is exemplified hereinafter. FIG. 11 is a schematic view of one implementation scheme of the multi-band multi-path receiving and transmitting device for two single-band transceivers according to Embodiment 3 of the present invention, which is illustrated in detail as follows.

FIG. 11 is a schematic view of F1 frequency band 2T4R and F2 frequency band 2T4R realized by the multi-band multi-path receiving and transmitting device according to Embodiment 3 of the present invention (the signal processing module is omitted in all schematic views for simplification).

As shown in FIG. 11, an F1 frequency band transceiver supports single frequency band 2T4R, that is, F1 frequency band 2T4R. An F1 frequency band transmitting branch 1 and an F1 frequency band receiving branch 1 of the F1 frequency band transceiver share an antenna port of the F1 frequency band transceiver through a multi-frequency coupler, and meanwhile the multi-frequency coupler further has a path of output provided to a receiving branch at another frequency band, that is, an F2 frequency band receiving branch for use, and the multi-frequency coupler is connected with an F2 frequency band receiving branch 3 of an F2 frequency band transceiver through a cable 1 in this scheme. In this manner, a connection is realized, and the F1 frequency band transmitting branch 1, the F1 frequency band receiving branch 1, and the F2 frequency band receiving branch 3 share one antenna branch 1.

An F1 frequency band transmitting branch 2 and an F1 frequency band receiving branch 2 of the F1 frequency band transceiver share another antenna port of the F1 frequency band transceiver through a multi-frequency coupler, and meanwhile the multi-frequency coupler further has a path of output provided to a receiving branch at another frequency band, that is, an F2 frequency band receiving branch for use, and the multi-frequency coupler is connected with an F2 frequency band receiving branch 4 of an F2 frequency band transceiver through a cable 2 in this scheme. In this manner, a connection is realized, and the F1 frequency band transmitting branch 2, the F1 frequency band receiving branch 2, and the F2 frequency band receiving branch 4 share one antenna branch 2.

It should be noted that, the cable 1 and the cable 2 connected with the ports output from the multi-frequency couplers are connected with the F2 frequency band receiving branch 3 and the F2 frequency band receiving branch 4 respectively without sequence requirement, but are only allowed to be connected with independent receiving branches at frequency bands different from the F1 frequency band.

Similarly, an F2 frequency band transceiver supports single frequency band 2T4R, that is, F2 frequency band 2T4R. An F2 frequency band transmitting branch 1 and an F2 frequency band receiving branch 1 of the F2 frequency band transceiver share an antenna port of the F2 frequency band transceiver through a multi-frequency coupler, and meanwhile the multi-frequency coupler further has a path of output provided to a receiving branch at another frequency band, that is, an F1 frequency band receiving branch for use, and the multi-frequency coupler is connected with an F1 frequency band receiving branch 3 of an F1 frequency band transceiver through a cable 3 in this scheme. In this manner, a connection is realized, and the F2 frequency band transmitting branch 1, the F2 frequency band receiving branch 1, and the F1 frequency band receiving branch 3 share one antenna branch 3.

An F2 frequency band transmitting branch 2 and an F2 frequency band receiving branch 2 of the F2 frequency band transceiver share another antenna port of the F2 frequency band transceiver through a multi-frequency coupler, and meanwhile the multi-frequency coupler further has a path of output provided to a receiving branch at another frequency band, that is, an F1 frequency band receiving branch for use, and the multi-frequency coupler is connected with an F1 frequency band receiving branch 4 of an F1 frequency band transceiver through a cable 4 in this scheme. In this manner, a connection is realized, and the F2 frequency band transmitting branch 2, the F2 frequency band receiving branch 2, and the F1 frequency band receiving branch 4 share one antenna branch 4.

It should be noted that, the cable 3 and the cable 4 connected with the ports output from the multi-frequency couplers are connected with the F1 frequency band receiving branch 3 and the F1 frequency band receiving branch 4 respectively without sequence requirement, but are only allowed to be connected with independent receiving branches at frequency bands different from the F2 frequency band.

In an embodiment, the present invention further provides a base station system, which includes the multi-band multi-path receiving and transmitting device according to Embodiment 3 of the present invention, and specifically, includes the multi-band multi-path receiving and transmitting device as shown in FIGS. 10 and 11.

Figure 12:
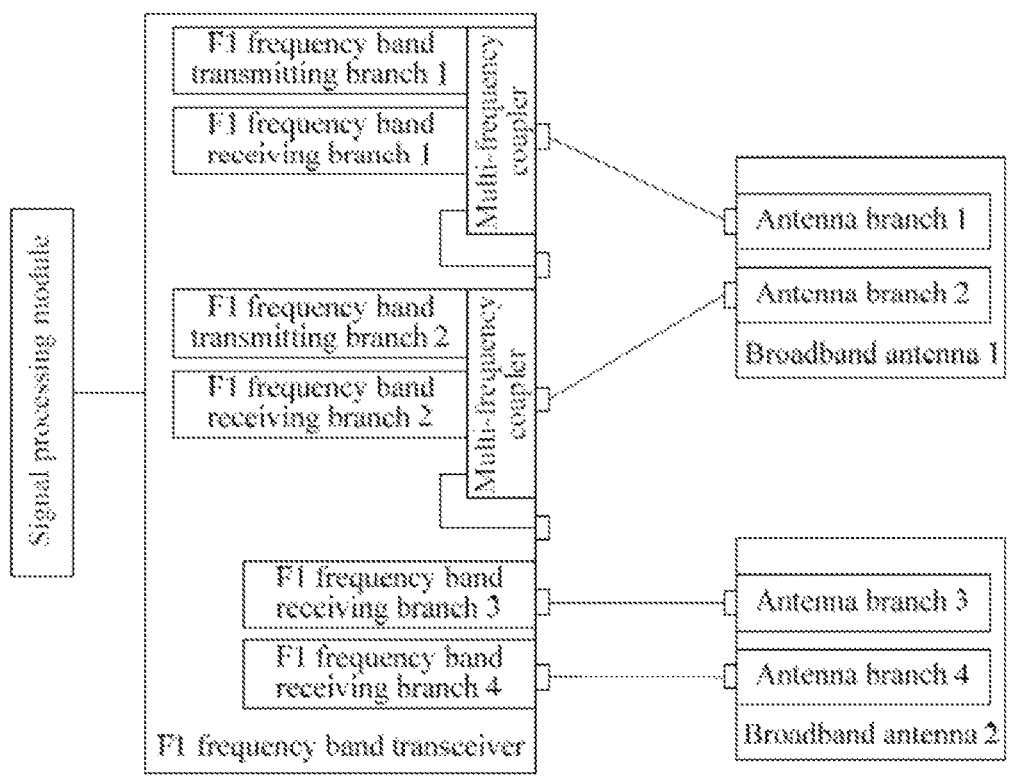
FIG. 12 is a schematic view of F1 frequency band 2T4R independently realized by an F1 frequency band transceiver in the multi-band multi-path receiving and transmitting device according to Embodiment 3 of the present invention.

Further, one single-band transceiver in this embodiment is capable of realizing single-band multi-path receiving. FIG. 12 is a schematic view of F1 frequency band 2T4R independently realized by an F1 frequency band transceiver in the multi-band multi-path receiving and transmitting device according to Embodiment 3 of the present invention.

As shown in FIG. 12, an F1 frequency band transceiver supports single frequency band 2T4R, that is, F1 frequency band 2T4R. An F1 frequency band transmitting branch 1 and an F1 frequency band receiving branch 1 of the F1 frequency band transceiver share an antenna port of the F1 frequency band transceiver through a multi-frequency coupler, so that a connection is realized, and the F1 frequency band transmitting branch 1 and the F1 frequency band receiving branch 1 share one antenna branch 1.

An F1 frequency band transmitting branch 2 and an F1 frequency band receiving branch 2 of the F1 frequency band transceiver share another antenna port of the F1 frequency band transceiver through a multi-frequency coupler, so that a connection is realized, and the F1 frequency band transmitting branch 2 and the F1 frequency band receiving branch 2 share one antenna branch 2.

The F1 frequency band receiving branch 3 of the F1 frequency band transceiver occupies another antenna port of the F1 frequency band transceiver, so that a connection is realized, and the F1 frequency band transmitting branch 1 occupies one antenna branch 3.

The F1 frequency band receiving branch 4 of the F1 frequency band transceiver occupies another antenna port of the F1 frequency band transceiver, so that a connection is realized, and the F1 frequency band transmitting branch 1 occupies one antenna branch 4.

Figure 13:
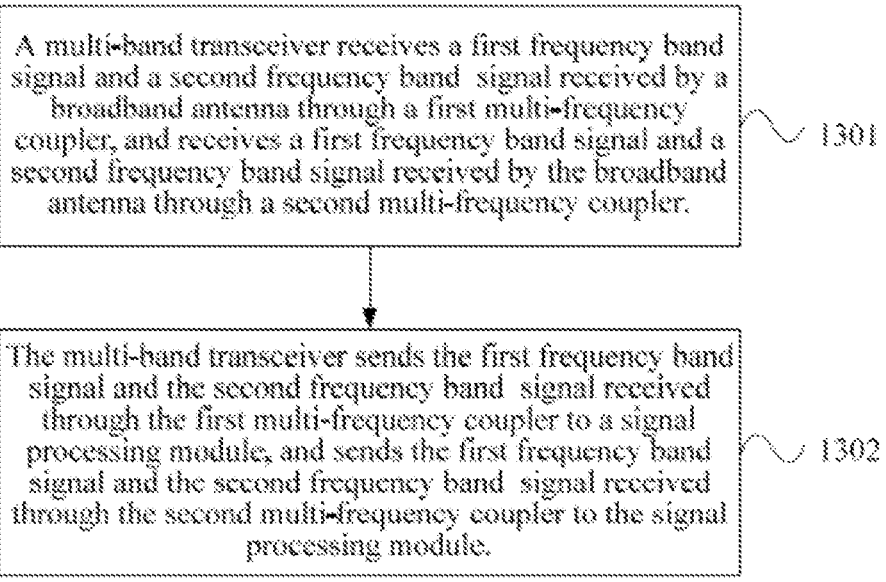
FIG. 13 is a schematic flow chart of a multi-band multi-path receiving and transmitting method according to Embodiment 4 of the present invention.

FIG. 13 is a schematic flow chart of a multi-band multi-path receiving and transmitting method according to Embodiment 4 of the present invention. As shown in FIG. 13, the multi-band multi-path receiving and transmitting method of this embodiment includes the following steps.

In step 1301, a multi-band transceiver receives a first frequency band signal and a second frequency band signal received by a broadband antenna through a first multi-frequency coupler, and receives a first frequency band signal and a second frequency band signal received by the broadband antenna through a second multi-frequency coupler.

In step 1302, the multi-band transceiver sends the first frequency band signal and the second frequency band signal received through the first multi-frequency coupler to a signal processing module, and sends the first frequency band signal and the second frequency band signal received through the second multi-frequency coupler to the signal processing module.

In this embodiment, the multi-frequency coupler is disposed external to the multi-band transceiver, so as to decrease the number of the transceivers, thereby reducing the material cost and the mounting cost of the base station system.

Further, the first multi-frequency coupler and the second multi-frequency coupler may be built in the multi-band transceiver, and the multi-band transceiver can receive the first frequency band signal and the second frequency band signal received by the broadband antenna through the built-in first multi-frequency coupler and the built-in second multi-frequency coupler. For the external multi-frequency combiner, the requirement of minimal isolation (generally about 50 dB) between signals at different frequency bands sharing the same broadband antenna needs to be considered, and the isolation index of the multi-frequency combiner can be specifically satisfied with a metal cavity filter, in which each frequency band needs 4 to 5 resonance cavities. However, the multi-frequency coupler built in the multi-band transceiver in the embodiment of the present invention may be jointly designed as a whole with a duplexer of the multi-band transceiver (which may be realized with the metal cavity filter), and each frequency band satisfies the isolation requirement only in need of adding 1 to 2 resonance cavities. Thereby, the number of cavities of the metal cavity filter is decreased, and the loss of the received signal and the transmitted signal is reduced.

In this embodiment, by utilizing the characteristic that the broadband antenna covers a plurality of frequency bands, corresponding to each antenna branch, in a multi-frequency coupling manner, received signals at all frequency bands are received in the multi-band transceiver, and are shared by the receiving branch of each frequency band, thereby realizing multi-band multi-path receiving. In the multi-band multi-path receiving and transmitting device of this embodiment, since the multi-frequency coupler is built in the multi-band transceiver, a jumper does not need to be connected with the receiving branch/transmitting branch of the multi-band transceiver, so that the loss of the received signal and the transmitted signal is reduced, thereby improving the coverage performance of the base station. Meanwhile, since the multi-frequency coupler is built in the multi-band transceiver, the material cost and the mounting cost of the base station system are also reduced.

Figure 14:
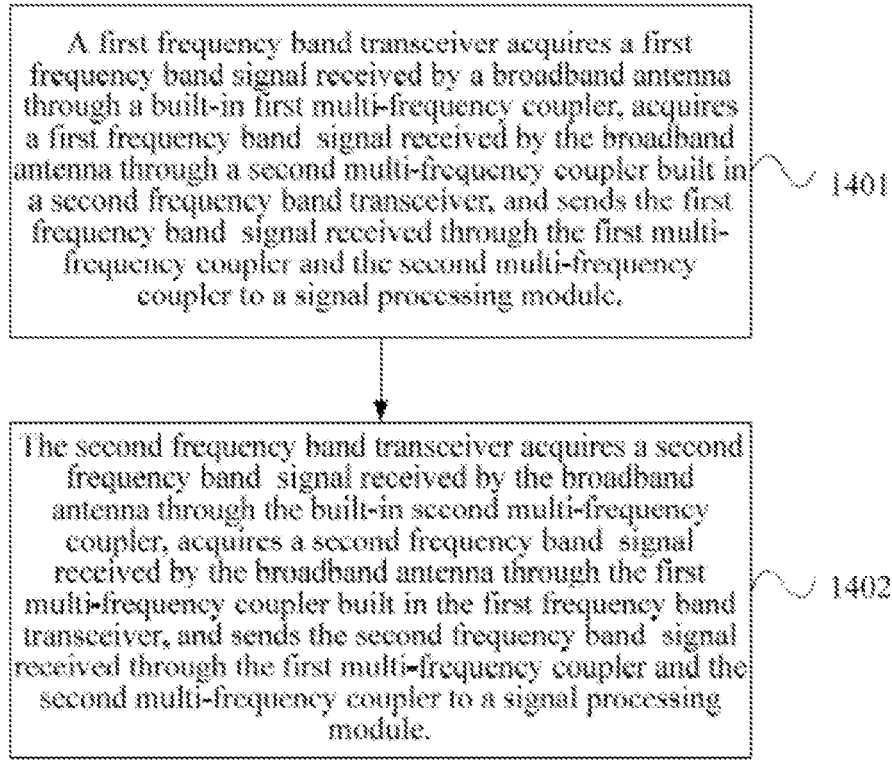
FIG. 14 is a schematic flow chart of another multi-band multi-path receiving and transmitting method according to Embodiment 5 of the present invention.

FIG. 14 is a schematic flow chart of another multi-band multi-path receiving and transmitting method according to Embodiment 5 of the present invention. The multi-band multi-path receiving and transmitting method of this embodiment includes the following steps.

In step 1401, a first frequency band transceiver acquires a first frequency band signal received by a broadband antenna through a built-in first multi-frequency coupler, acquires a first frequency band signal received by the broadband antenna through a second multi-frequency coupler built in a second frequency band transceiver, and sends the first frequency band signal received through the first multi-frequency coupler and the second multi-frequency coupler to a signal processing module.

In step 1402, the second frequency band transceiver acquires a second frequency band signal received by the broadband antenna through the built-in second multi-frequency coupler, acquires a second frequency band signal received by the broadband antenna through the first multi-frequency coupler built in the first frequency band transceiver, and sends the second frequency band signal received through the first multi-frequency coupler and the second multi-frequency coupler to a signal processing module.

In this embodiment, by building the multi-frequency coupler in one single-band transceiver, only a small number of jumpers need to be connected with the receiving branch of another single-band transceiver, so that the loss of the received signal and the transmitted signal is reduced, thereby improving the coverage performance of the base station. Meanwhile, since the multi-frequency coupler is built in the multi-band transceiver or the single-band transceiver, the material cost and the mounting cost of the base station system are also reduced.

For the external multi-frequency combiner, the requirement of minimal isolation (generally about 50 dB) between signals at different frequency bands sharing the same broadband antenna needs to be considered, and the isolation index of the multi-frequency combiner can be specifically satisfied with a metal cavity filter, in which each frequency band needs 4 to 5 resonance cavities. However, the multi-frequency coupler built in the multi-band transceiver in the embodiment of the present invention may be jointly designed as a whole with a duplexer of the multi-band transceiver (which may be realized with the metal cavity filter), and each frequency band satisfies the isolation requirement only in need of adding 1 to 2 resonance cavities. Thereby, the number of cavities of the metal cavity filter is decreased, and the loss of the received signal and the transmitted signal is reduced.

In this embodiment, by utilizing the characteristic that the broadband antenna covers a plurality of frequency bands, corresponding to each antenna branch, in a multi-frequency coupling and jumper manner, received signals at all frequency bands are received in the single-band transceiver, and are shared by the receiving branch of each frequency band, thereby realizing multi-band multi-path receiving. In the multi-band multi-path receiving and transmitting device of this embodiment, since the multi-frequency coupler is built in the single-band transceiver, only several jumpers need to be connected with the receiving branch of the single-band transceiver, so that the loss of the received signal and the transmitted signal is reduced, thereby improving the coverage performance of the base station. Meanwhile, since the multi-frequency coupler is built in the single-band transceiver, the material cost and the mounting cost of the base station system are also reduced.

It should be pointed out that, the embodiments of the present invention are not only applicable to a Frequency Division Duplexing (FDD) system, but also applicable to a Time Division Duplexing (TDD) system, and other systems, such as a combined system of FDD and TDD.

Persons of ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A multi-band multi-path receiving and transmitting device, comprising:
    a first multi-frequency coupler;
    a second multi-frequency coupler;
    a multi-band transceiver coupled with the first multi-frequency coupler and the second multi-frequency coupler, the multi-band transceiver comprising at least two first frequency band receiving branches and at least two second frequency band receiving branches; and
    a signal processing module, coupled with the multi-band transceiver;
    wherein the first multi-frequency coupler is configured to receive a first frequency band signal and a second frequency band signal from an antenna, and to send the first frequency band signal and the second frequency band signal to the multi-band transceiver,
    wherein the second multi-frequency coupler is configured to receive the first frequency band signal and the second frequency band signal from the antenna, and to send the first frequency band signal and the second frequency band signal to the multi-band transceiver, wherein the at least two first frequency band receiving branches are configured to receive the first frequency band signals from the first multi-frequency coupler and the second multi-frequency coupler, and to send the first frequency band signals to the signal processing module, wherein the at least two second frequency band receiving branches are configured to receive the second frequency band signals from the first multi-frequency coupler and the second multi-frequency coupler, and to send the second frequency band signals to the signal processing module, and wherein the signal processing module is configured to receive the first frequency band signals from the at least two first frequency band receiving branches and process the first frequency band signals and also configured to receive the second frequency band signals from the at least two second frequency band receiving branches and process the second frequency band signals.

2. The device according to claim 1, wherein the first and second multi-frequency couplers are located outside of the multi-band transceiver.

3. The device according to claim 1, wherein the multi-band transceiver is a single multi-band transceiver.

4. The device according to claim 3, wherein the at least two first frequency band receiving branches and the at least two second frequency band receiving branches are integrated in the multi-band transceiver.

5. The device according to claim 1, wherein the signal processing module is a baseband processing module configured to perform baseband processing on the first frequency band signals from the at least two first frequency band receiving branches and the second frequency band signals from the at least two second frequency band receiving branches.

6. A method for multi-band multi-path processing, comprising:

receiving, by a first multi-frequency coupler, a first frequency band signal and a second frequency band signal from an antenna, and sending the first frequency band signal and the second frequency band signal to a multi-band transceiver;

receiving, by a second multi-frequency coupler, the first frequency band signal and the second frequency band signal from the antenna, and sending the first frequency band signal and the second frequency band signal to the multi-band transceiver;

receiving, by at least two first frequency band receiving branches in the multi-band transceiver, the first frequency band signals from the first multi-frequency coupler and the second multi-frequency coupler, and sending the first frequency band signals to the signal processing module, receiving, by at least two second frequency band receiving branches in the multi-band transceiver, the second frequency band signals from the first multi-frequency coupler and the second multi-frequency coupler, and sending the second frequency band signals to the signal processing module, and processing, by the signal processing module, the first frequency band signals from the at least two first frequency band receiving branches and the second frequency band signals from the at least two second frequency band receiving branches.

* * * * *